(12) United States Patent
Kukreja et al.

(10) Patent No.: US 10,210,141 B2
(45) Date of Patent: Feb. 19, 2019

(54) STYLIZING TEXT BY REPLACING GLYPH WITH ALTERNATE GLYPH

(71) Applicant: ADOBE SYSTEMS INCORPORATED, San Jose, CA (US)

(72) Inventors: Dinesh Kukreja, Gurgaon (IN); Reena Agrawal, Delhi (IN); Sameer Manuja, Ghaziabad (IN); Mohammad Javed Ali, Delhi (IN); Vineet, Ghaziabad (IN); Mrinalini Sardar, Noida (IN)

(73) Assignee: Adobe Systems Incorporated, San Jose, CA (US)

(*) Notice: Subject to any disclaimer, the term of this patent is extended or adjusted under 35 U.S.C. 154(b) by 35 days.

(21) Appl. No.: 15/150,050

(22) Filed: May 9, 2016

(65) Prior Publication Data

US 2017/0322913 A1 Nov. 9, 2017

(51) Int. Cl.
*G06F 17/00* (2006.01)
*G06F 17/21* (2006.01)
*G06F 17/24* (2006.01)
*G06F 3/023* (2006.01)

(52) U.S. Cl.
CPC .......... *G06F 17/214* (2013.01); *G06F 3/0236* (2013.01); *G06F 17/24* (2013.01)

(58) Field of Classification Search
CPC ..................................................... G06F 17/214
See application file for complete search history.

(56) References Cited

U.S. PATENT DOCUMENTS

| | | | | |
|---|---|---|---|---|
| 2005/0099406 | A1* | 5/2005 | Pettiross | G09G 5/00 345/179 |
| 2014/0195903 | A1* | 7/2014 | Kaasila | G06F 17/214 715/269 |
| 2015/0100882 | A1* | 4/2015 | Severenuk | G06F 17/214 715/269 |

* cited by examiner

*Primary Examiner* — Scott T Baderman
*Assistant Examiner* — Barbara M Level
(74) *Attorney, Agent, or Firm* — Shook, Hardy & Bacon L.L.P.

(57) ABSTRACT

Systems and methods provide for replacing a glyph in text displayed by an application with an alternate glyph. A glyph is selected, and the character and font of the glyph are identified. Alternate glyphs for the character in the font are then determined, and a visual indicator is displayed proximate to the glyph in the text to indicate availability of the alternate glyphs. In response to a user action associated with the glyph and/or visual indicator, the alternate glyphs are presented. A user can then select one of the alternate glyphs, and the original glyph in the text is replaced with the selected alternate glyph.

16 Claims, 17 Drawing Sheets

While applying the alternates from the mini Glyph panel, we are preserving the characteristic of the Glyph. Here we are changing the alternate but preserving the characteristic as well¹ ~702A

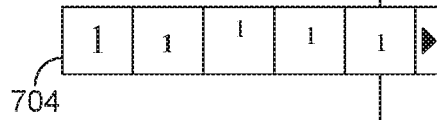

704

706~¹ This is footnote

*FIG. 7A.*

While applying the alternates from the mini Glyph panel, we are preserving the characteristic of the Glyph. Here we are changing the alternate but preserving the characteristic as well ₁~702B 706~¹ This is footnote

*FIG. 7B.*

902A 

Enda epro optatiumque veribuscius, conescime explaborum-
Genc cepro optatiumque veribusius, conescime explaborum
Enlam, qui ratemolorum del int, as deliqui debitam.
Verem repta eosam, quianimus voluptaspic tendel st ut erchillo magnimo con-
sequ atistnu ratemolorum del int, as deliqui debitam verem repta eosam, qui-

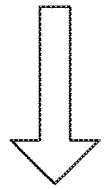

902B 

Endanimus ut ra conecepro optatiumque veribuscius, conescime explaborum-
Gendanimus ut ra conecepro optatiumque veribusius, conescime explaborum
Enlam, qui ratemolorum del int, as deliqui debitam.
Verem repta eosam, quianimus voluptaspic tendel st ut erchillo magnimo con-
sequ atistnu ratemolorum del int, as deliqui debitam verem repta eosam, qui-

*FIG. 9A.*

904A

ANDANIMUS UT RA CONCECEPRO OPTATIUMQUE VERIBUS-
CIUS, CONESCIME EXPLABORUMGENDANIMUS UT RA
CONECEPRO OPTATIUMQUE VERIBUSCIUS, CONESCIME
EXPLABORUM ENIAM. QUI RATEMOLORUM DEL INT. AS DELIQUI
DEBITAM. OPTATIUMQUE VERIBUSCIUS. CONESCIME EXPLABORUM
ENIAM. QUI RATEMOLORUM DEL INT. AS DELIQUI DEBITAM.

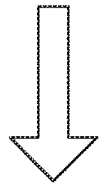

904B

ANDANIMUS UT RA CONCECEPRO OPTATIUMQUE VERIBUS-
CIUS, CONESCIME EXPLABORUMGENDANIMUS UT RA
CONECEPRO OPTATIUMQUE VERIBUSCIUS, CONESCIME
EXPLABORUM ENIAM. QUI RATEMOLORUM DEL INT. AS DELIQUI
DEBITAM. OPTATIUMQUE VERIBUSCIUS. CONESCIME EXPLABORUM
ENIAM. QUI RATEMOLORUM DEL INT. AS DELIQUI DEBITAM.

*FIG. 9B.*

STYLIZING TEXT BY REPLACING GLYPH WITH ALTERNATE GLYPH

BACKGROUND

Some computer font formats, such as OpenType, offer font designers a repertoire of rich and sophisticated typographic features. These typographic features provide font designers with advanced typographic controls for their font designs, allowing for a large number of different glyphs for each character in a font. As a result, the number of fonts that support these typographic features has grown exponentially.

Despite the adoption of these typographic features by font designers, software applications offering typesetting capabilities have failed to provide users with an easy and intuitive way to apply these typographic features for stylizing text when creating content. Most users are not even aware of the existence of such typographic features in applications. This is because the typographic features are embedded deeply inside applications with complex ways of accessing the capabilities. A user has to navigate through series of menus, drop down boxes, or other navigational tools to find the typographic features. As such, it is a confusing and time consuming task to apply typographic features. This discourages users from using these powerful features, and as a result, many users won't bother.

Even if a user does navigate through the menus or drop down boxes, the various options are not explained. Users are not provided with any understanding regarding how the typographic features will impact the appearance of the text. There is no visual information or preview available so users are not sure how the text will look after applying a particular typographic feature. For at least these reasons, there are numerous occasions where users won't/aren't able to use the capabilities of these powerful typographic features which would help them better stylize their text and create a better design.

SUMMARY

Embodiments of the present invention relate to, among other things, a way for allowing users to stylize text using typographic features by employing an efficient and intuitive process of replacing a glyph with an alternate glyph. In accordance with embodiments described herein, a glyph displayed in text of an application is selected. The character and font of the glyph are determined, and alternative glyph(s) for that character in the font are identified. The alternate glyph(s) are different renderings of the character using different typographic features (e.g., OpenType features) used by the font. A visual indicator is displayed proximate to the glyph to indicate the availability of the alternate glyph(s). When a user action associated with the glyph and/or visual indicator is detected (e.g., when a user hovers a mouse near the glyph), the alternate glyphs(s) are displayed proximate to the glyph. The user can then select an alternate glyph, and the original glyph in the text is replaced with the selected alternate glyph.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 7A and 7B are screen displays illustrating replacing a footnote reference glyph in text with an alternate glyph while maintaining the footnote in accordance with some implementations of the present disclosure;

FIGS. 9A-9D are screen displays illustrating several use cases of replacing a glyph in text with an alternate glyph in accordance with some implementations of the present disclosure;

DETAILED DESCRIPTION

Figure 1:
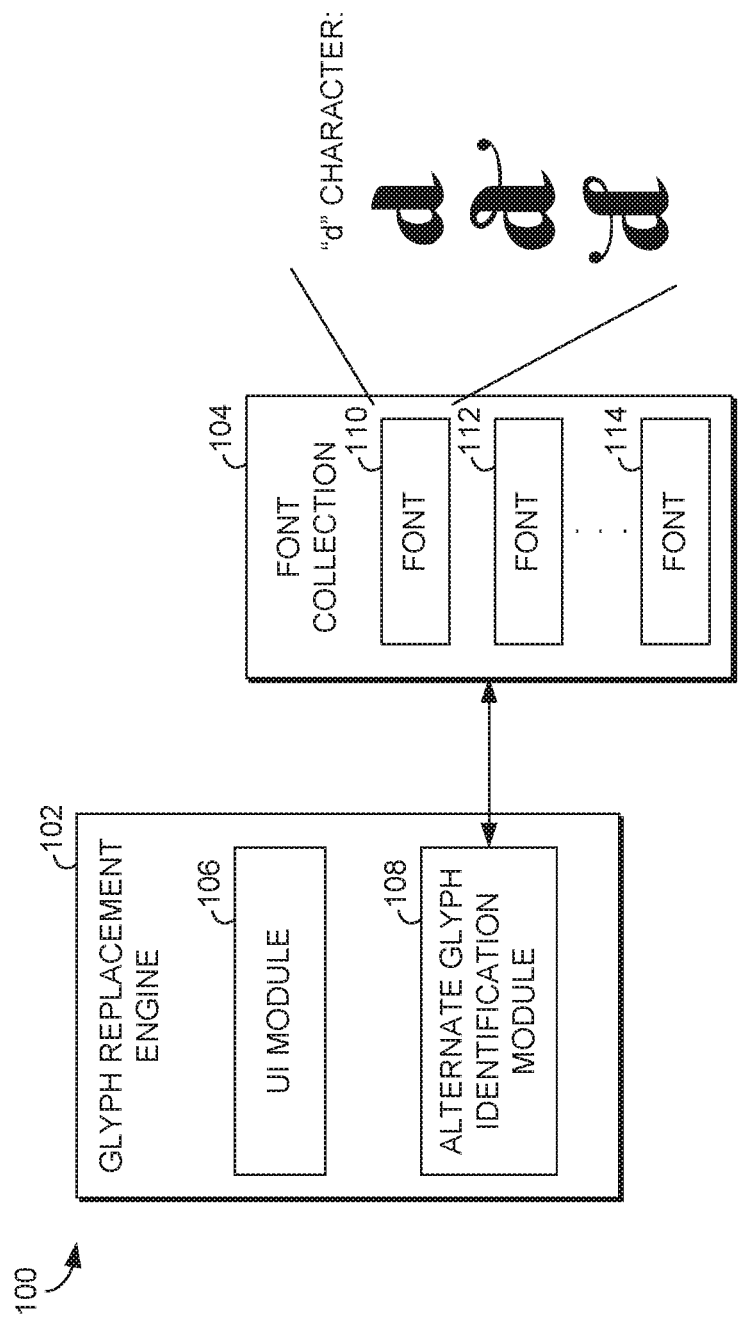
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention address the technical challenge of exposing typographic features in fonts by providing an efficient and intuitive way to replace glyphs in text with alternate glyphs. As used herein, a "glyph" refers to a specific instance or rendering of a character in a font. The term "character" is used herein to represent the general concept of a letter, number, symbol, ideograph, or the like. A single font can have multiple glyphs for a given character, each glyph having different typographic features applied.

In accordance with embodiments herein, a glyph in text displayed by an application is selected. A determination is made regarding whether any alternate glyphs are available in the font for the displayed glyph. If so, a visual indicator is displayed adjacent to the glyph indicating to the user that at least one alternate glyph is available for that glyph. Responsive to a user action associated with the glyph, the alternate glyph(s) are displayed. The user can then select an alternate glyph, and the selected alternate glyph is displayed in the text in place of the original glyph. This provides an intuitive, non-obtrusive, and easy way for users to apply different typographic features to their ext. Because alternative glyphs are displayed, users don't have to have an understanding of typographic features or have to search for the various features using various navigation tools. They can simply view the various alternate glyphs and select one to replace the original glyph.

Some embodiments provide for replacement of glyphs in words displayed in text In such configurations, a word is initially selected. A glyph within the selected word is then identified as having at least one alternate glyph, and a visual indicator is displayed proximate to the glyph allowing the user to replace the glyph in the word with an alternate glyph. Further embodiments extend the glyph replacement approach to fractions. In particular, a number in text is identified as being a fraction (e.g., having two numbers separated by a slash). In response, the font is queried to determine if the font uses a fraction typographic feature. If so, a visual indicator is displayed proximate to the number in the text allowing the user to replace the number with a fraction alternate that employs the fraction typographic feature.

With reference now to the drawings, FIG. 1 is a block diagram illustrating an exemplary system 100 for replacing glyphs in text with alternate glyphs in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a glyph replacement engine 102 operable to replace glyphs displayed in text with alternate glyphs. The system 100 also includes a font collection 104. The font collection 104 includes a number of different fonts, including font 110, font 112, and font 114. It should be understood that in practice, the font collection 104 can have any number of different fonts. Each font sets forth one or more glyphs for each character in the font with different typographic features applied to the glyphs. By way of example to illustrate, the font 110 includes three different glyphs for the lowercase "d" character. The glyph replacement engine 102 and/or font collection 104 can be provided, for instance, by a standalone application, a service or hosted service (standalone or in combination with another hosted service), or a plug-in to another product, to name a few.

As shown in FIG. 1, the glyph replacement engine 102 includes a UI module 106 and an alternate glyph identification module 108. The UI module 106 facilitates user interaction with displayed text in order to replace glyphs in the text with alternate glyphs, for instance, using the approaches described herein below with reference to FIGS. 2, 6, 10, and 12. Generally, the UI module 106 receives a selection of a glyph in displayed text. This can be done automatically (e.g., after the glyph is entered) or in response to a user action (e.g., a using "clicking" on the glyph). The alternate glyph identification module 108 operates to determine whether there are any alternate glyphs available for the selected glyph. In some configurations, the alternate glyph identification module 108 identifies the font and character of the selected glyph and then queries the corresponding font in the font collection for alternate glyphs. For example, suppose the selected glyph is the first glyph for the lowercase "d" character in the font 110 shown in FIG. 1. Accordingly, the alternate glyph identification module 108 would identify the other two glyphs shown in FIG. 1 as alternate glyphs.

Based on identification of alternate glyphs, the UI module 106 causes the display of a visual indicator associated with the displayed glyph. In response to a user action associated with the glyph (e.g., hovering a cursor over the glyph and/or the visual indicator), the UI module 106 causes the display of available alternate glyphs. Continuing the example above in which the selected glyph is the first glyph for the lowercase "d" character shown in FIG. 1, the UI module 106 causes the display of the other two glyphs for the lowercase "d" character. Responsive to a user selection of one of those alternate glyphs, the UI module 106 causes the selected alternate glyph to be displayed in place of the original glyph. This approach is discussed in further detail below with reference to the method 200 of FIG. 2 and illustrated in FIGS. 4A-4D.

In some configurations, the glyph replacement engine 102 facilitates replacing glyphs in selected words. The UI module 106 receives a selection of a word displayed in text. The selection of the word can done automatically (e.g., when the word is entered in the text) or manually by the user (e.g., the user clicking on the word). The alternate glyph identification module 108 then identifies a glyph in the word having at least one alternate glyph. In some configurations, this includes a user selecting a glyph in the word and the alternate glyph identification module 108 querying the font collection 104 for alternate glyphs for the font and character of the selected glyph. In other configurations, the glyph replacement engine 102 iterates through each glyph in the selected word until the alternate glyph identification module 108 identifies a glyph having alternate glyphs in the relevant font. A visual indicator is displayed adjacent to the selected glyph, and a user can chose to replace the glyph with an alternate glyph. This approach is discussed in further detail below with reference to the method 1000 of FIG. 10 and illustrated in FIGS. 11A-11D.

In further configurations, the glyph replacement engine 102 facilitates replacing a number in text with an alternate fraction if the font supports a fraction typographic feature. In particular, the glyph replacement engine 102 recognizes a number in text as a fraction (e.g., by identifying numbers separated by a slash). The alternate glyph identification module 108 determines the font of the number and queries that font in the font collection 104 to determine if the font uses a fraction typographic feature. If the font does use a fraction typographic feature, a visual indicator is displayed proximate to the number, and a user can chose to replace the number in the text with the alternate fraction. This approach is discussed in further detail below with reference to the method 1200 of FIG. 12 and illustrated in FIGS. 13A-13E.

Figure 2:
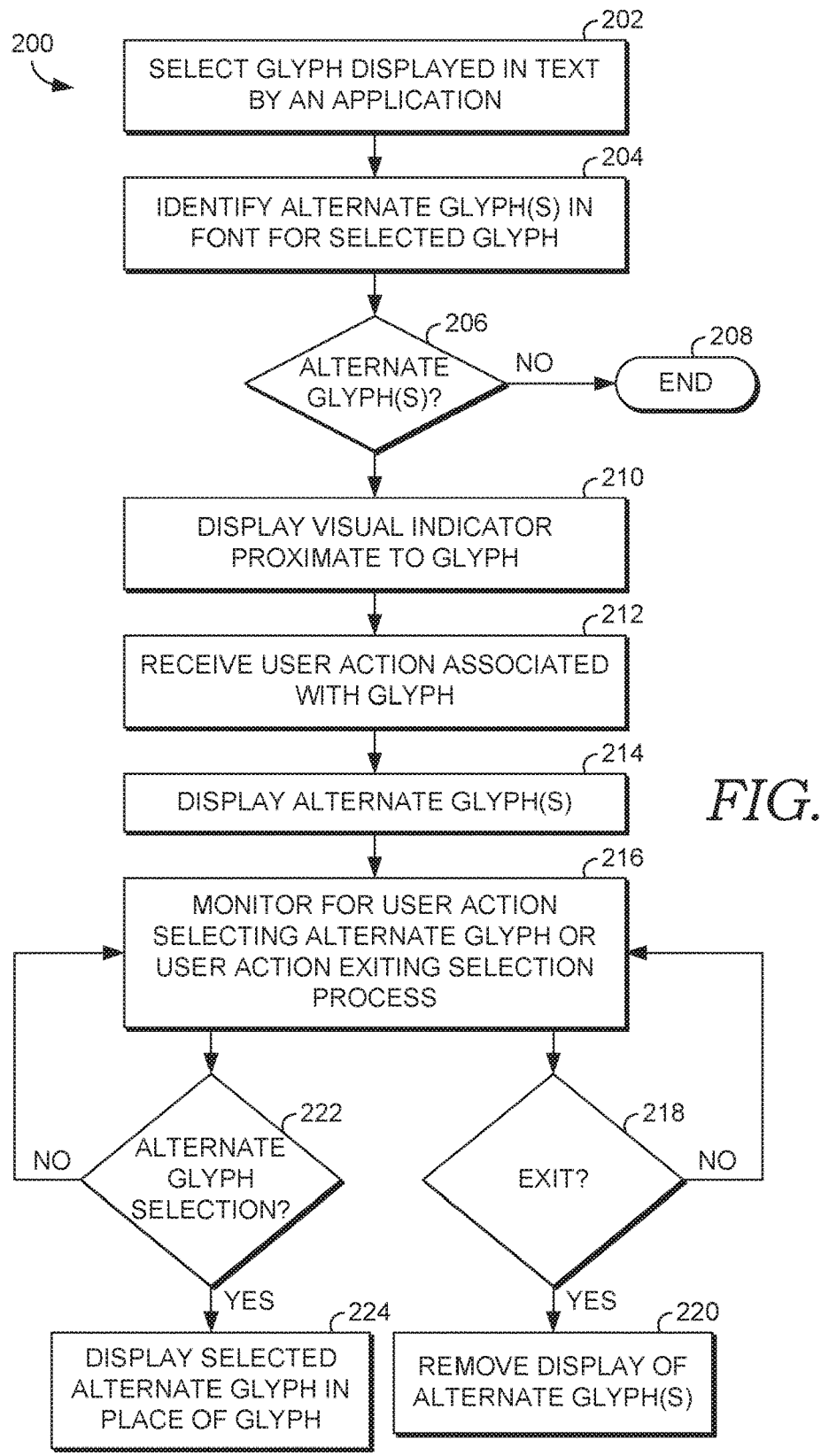
FIG. 2 is a flow diagram showing a method for selecting an alternate glyph for a glyph displayed in text in accordance with some implementations of the present disclosure.

Referring next to FIG. 2, a flow diagram is provided illustrating a method 200 for selecting an alternate glyph for a glyph displayed in text. Each block of the method 200 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method 200 can be performed at least in part, for instance, by the glyph replacement engine 102 of FIG. 1.

Figure 3:
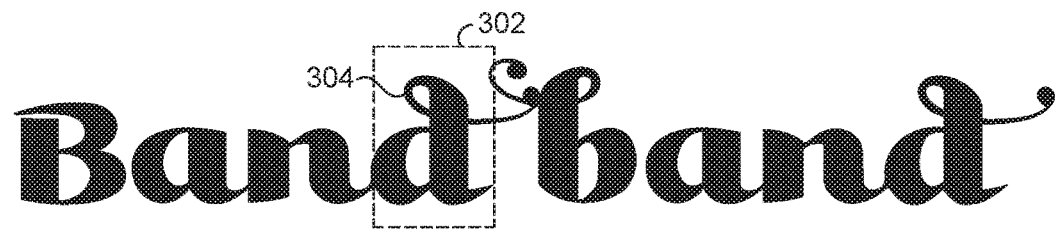
FIG. 3 is a diagram illustrating a hotspot area for detecting selection of a glyph in accordance with some implementations of the present disclosure.

As shown at block 202, a glyph in text displayed by an application is selected. The glyph can be selected in a variety of different manners. By way of example only and not limitation, in some configuration, the glyph is selected based on some user action exhibiting user intent to select the glyph. This could include, for instance, the user hovering a cursor over the glyph or the user employing a pointing device to select the glyph (e.g., using a mouse button to "click" on the glyph or touching the glyph using a pen or finger on a touchscreen device). In some configurations, an area around a glyph is defined (e.g., a hotspot area or bounding box), and a user action (e.g., cursor hover or selection with a pointing device) within the area is recognized as a selection of the glyph. By way of illustration, FIG. 3 shows a hotspot, area 302 surrounding the "d" glyph 304. While the hotshot area 302 is shown in FIG. 3 for illustration purposes, it should be understood that the hotspot area 302 may not be displayed to the user. When a user moves a cursor within the hotspot area 302 or performs some other action (e.g., clicking) in the hotspot area 302, the "d" glyph 304 is selected. A similar hotspot area can be defined around each glyph within the displayed text to allow for selection of each glyph.

In some configurations, a glyph can be automatically selected at block 202 without a user action exhibiting user intent to select the glyph. For instance, a glyph can be selected as the user types or otherwise enters glyphs, such that each glyph is examined using the process described herein as text is entered.

Any alternate glyphs available for the selected glyph are identified, as shown at block 204. In one configuration, the alternate glyphs are identified by determining the character and font of the glyph. Alternate glyphs for the character that are available in that font are then determined. This could include, for instance, identifying the Unicode of the selected glyph, and querying the font for alternate glyphs having that Unicode. Any number of alternate glyphs can be available for a given character in a font. In some instances, no alternate glyphs are available in the font, and the process ends at this point. In other instances, one or more alternate glyphs are available and identified.

Figure 4A:
FIGS. 4A-4D are screen displays illustrating replacing a glyph in text with an alternate glyph in accordance with some implementations of the present disclosure.

If it is determined at block 206 that no alternate glyphs are available in the font, the process ends as shown at block 208. Alternatively, if at least one alternate glyph is identified, a visual indicator is displayed proximate to the glyph to indicate availability of alternate glyph(s), as shown at block 210. Any of a variety of different visual indicators can be employed. In one configuration, a highlight (e.g., a blue highlight) is displayed under the selected glyph to indicate the availability of alternate glyphs. By way of example, FIG. 4A illustrates a highlight 402 placed under a "d" glyph 404 in the word "Bandband" 406. The highlight 402 serves as an indication to the user that at least one alternate glyph is available for the "d" glyph 404.

Returning again to FIG. 2, a user action associated with the glyph is received, as shown at block 212. The user action can be provided in a variety of different manners. In some configurations, an area (e.g., a hotspot area or bounding box) is defined around the glyph and/or the visual indicator, and a user action, such as a cursor hover or selection from a pointing device, within the area is interpreted as a user action associated with the glyph.

Figure 4B:
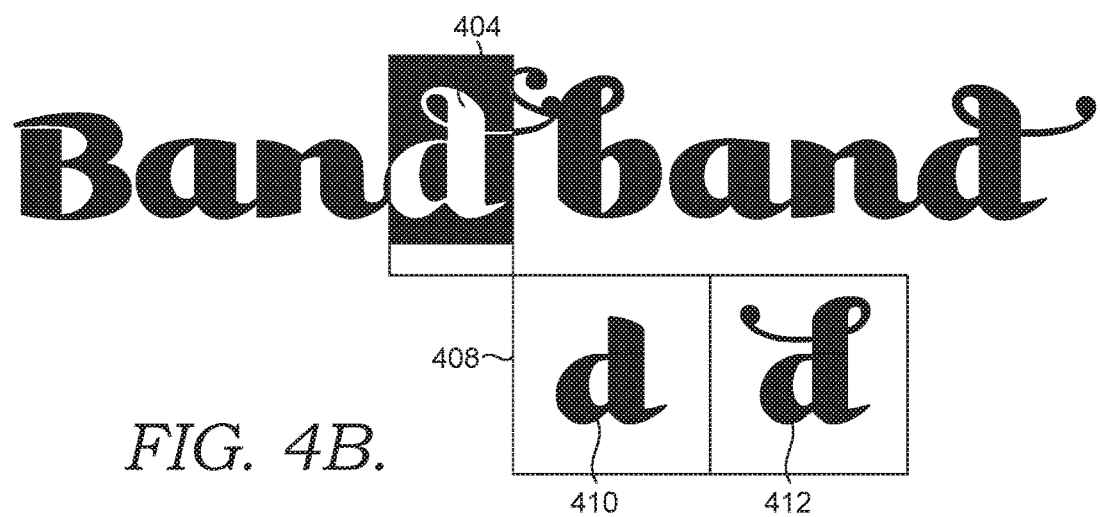

In response to the user action, the alternative glyphs are displayed proximate to the glyph, as shown at block 214. By way of example to illustrate, FIG. 4B shows a context menu 408 with two alternate glyphs 410 and 412 displayed proximate to the "d" glyph 404 in response to a user action associated with the "d" glyph 404. For example, the alternate glyphs 410 and 412 could be displayed in response to a user hovering over the highlight 402 in FIG. 4A.

Figure 5A:
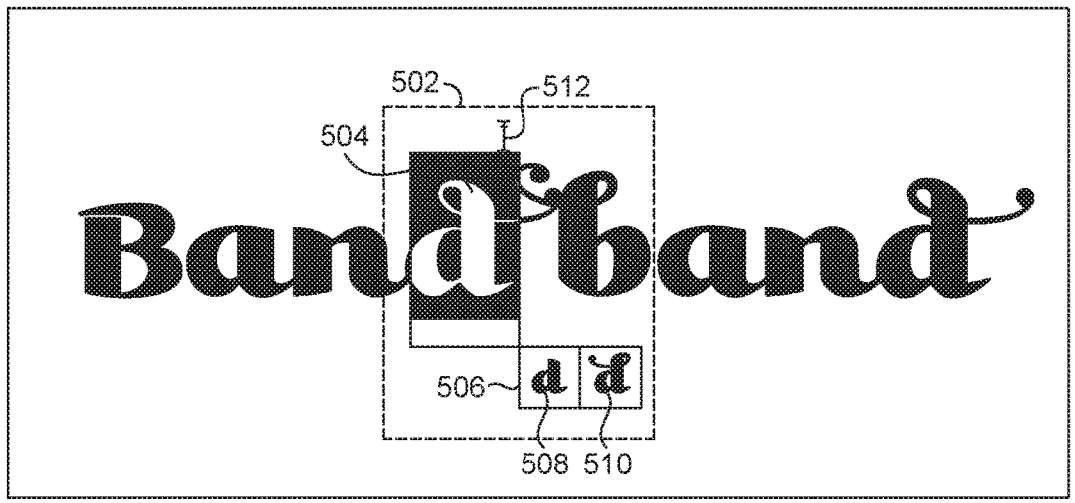
FIGS. 5A and 5B are diagrams showing a hotspot area for detecting cancelation of an alternate glyph selection process in accordance with some implementations of the present disclosure.
Figure 5B:
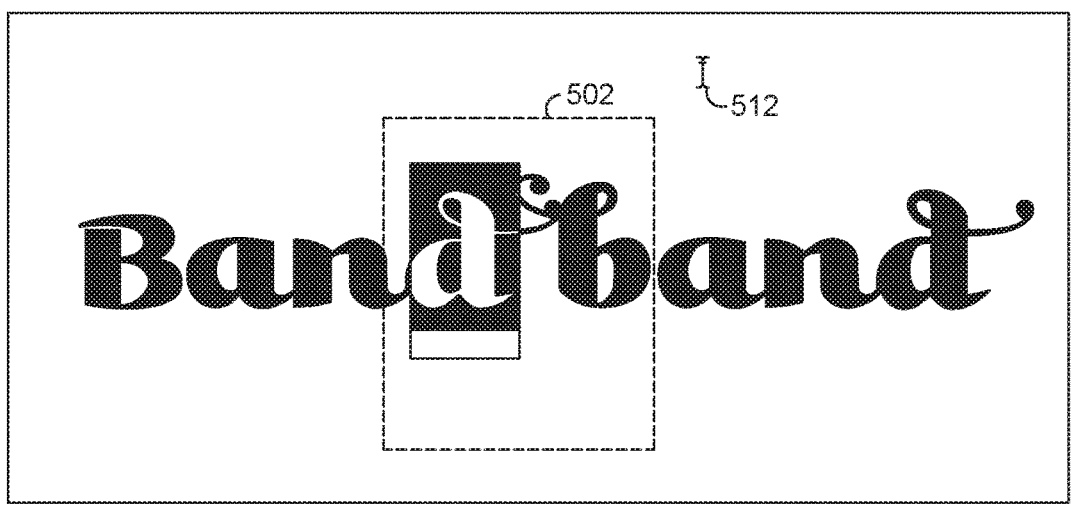

The process continues at block 216 by monitoring for either a user action associated with selection of an alternate glyph or a user action exiting from the alternate glyph selection process. If the user doesn't wish to apply any of the alternate glyphs, a user action is detected at block 218 to cancel the alternate glyph selection process. Any of a number of user actions could be used to cancel the alternate glyph selection process. For instance, a user pressing an escape key could be used to cancel the process. As another example, an area (e.g., hotspot area or bounding box) could be defined around the selected glyph and/or alternate glyphs, and a user action moving a cursor outside of the area or a user selection outside of the area could be used to cancel the process. In response to detecting such a user action, the alternate glyphs are no longer displayed, as shown at block 220. By way of illustration, FIG. 5A shows a hotspot area 502 surrounding both the "d" glyph 504 and context menu 506 with alternate glyphs 508 and 510. As shown in FIG. 5B, when a user moves a cursor 512 outside of the hotspot area 502, the context menu 506 is no longer displayed.

Figure 4C:
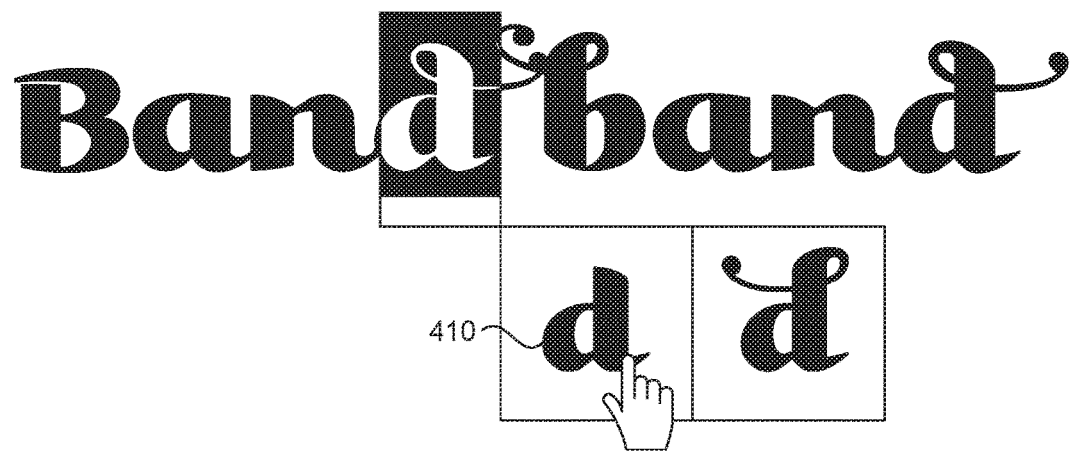

Turning back to FIG. 2, if the user decides to use an alternate glyph, a user action is detected at block 222 selecting an alternate glyph. Any of a number of user actions could be used to select an alternate glyph. For instance, a user could use a pointing device to select an alternate glyph. By way of example to illustrate, FIG. 4C shows a user selecting the alternate glyph 410 by using a mouse to click on the alternate glyph 410.

Figure 4D:
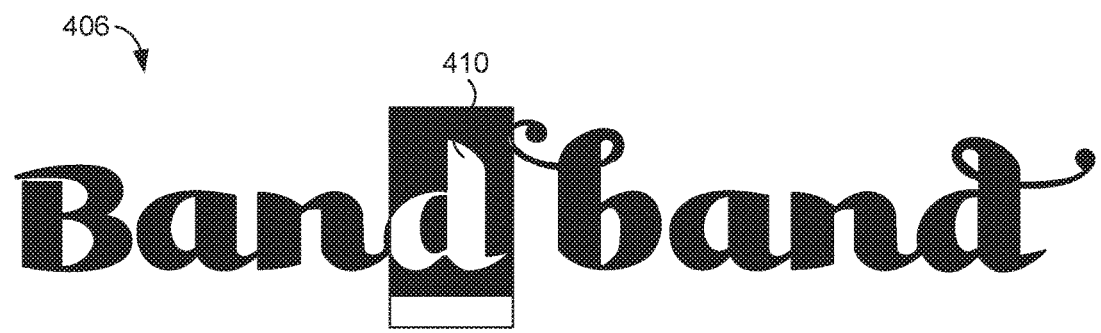

In response to detecting user selection of an alternate glyph, the selected alternate glyph is displayed in place of the original glyph in the text, as shown at block 224. By way of example to illustrate, FIG. 4D shows the alternate glyph 410 is now located in the text of the word "Bandband" 406.

In some configurations, the alternate glyph is displayed by replacing the original glyph with the alternate glyph. In other configurations, instead of simply replacing the original glyph with the alternate glyph, a process is employed in which typographical features are removed from the glyph and/or new typographical features are applied to the glyph to transform the original glyph to the selected alternate glyph. This approach is particularly useful in special cases in which there is data associated with a glyph that needs to remain intact, such as in the case of footnote references and ruby characters (annotative characters typically placed above or to the right of a logographic character—e.g., Chinese or Japanese characters). In such instances, simply replacing a glyph with an alternate glyph may affect data associated with the replaced glyph (e.g., delete a footnote or ruby character). However, by removing and adding typographic features without replacing the glyph, the associated data is left intact.

Figure 6:
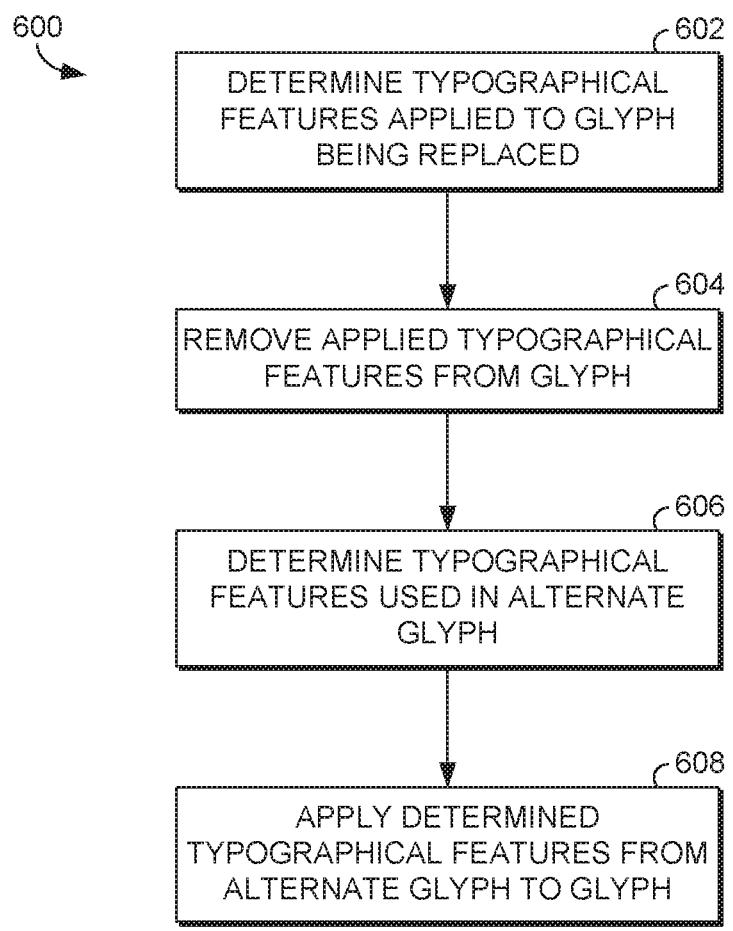
FIG. 6 is a flow diagram showing a method for removing typographic features from and adding typographic features to a displayed glyph to transform the glyph to an alternate glyph in accordance with some implementations of the present disclosure.

FIG. 6 provides a flow diagram showing a method 600 for removing typographic features from and adding typographic features to a displayed glyph to transform the glyph to an alternate glyph. As shown at block 602, typographic features applied to the glyph being replaced are determined. The features are determined in some configurations by identifying a glyph identifier and font of the glyph, and querying the font using the glyph identifier for any features applicable to the glyph. The identified typographic features are removed from the glyph, as shown at block 604. For instance, a list of features can be maintained for the glyph. This list of features includes typographic features. To remove a particular typographic feature, the feature is reset in the list of applied features. The typographic features used in the selected alternate glyph are determined, at block 606. The features are determined in some configurations by identifying a glyph identifier and font of the alternate glyph, and querying the font using the glyph identifier for any features applicable to the alternate glyph. Those identified typographic features from the alternate glyph are applied to the glyph, as shown at block 608. To apply a particular typographic feature to the glyph, the typographic feature is set in the list of features for the glyph.

By way of example to illustrate, FIGS. 7A and 7B are screenshots showing the display of an alternate glyph for a footnote reference. As shown in FIG. 7A, a footnote reference glyph 702A in the text has been selected, and a context menu 704 is presented with alternate glyphs. When the user selects an alternate glyph from the context menu 704, typographical features are removed from the displayed footnote reference glyph 702A and typographical features from the selected alternate glyph are applied such that the displayed footnote reference glyph 702B in FIG. 7B has the appearance of the selected alternate glyph. As can be seen from FIGS. 7A and 7B, the associated footnote 706 remains intact.

Figure 8A:
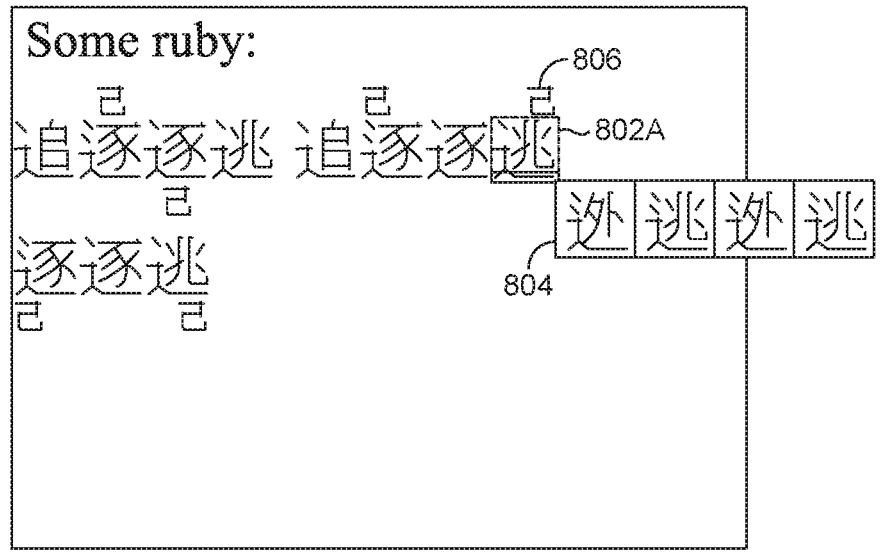
FIGS. 8A and 8B are screen displays illustrating replacing a glyph in ruby text with an alternate glyph while maintaining the ruby text in accordance with some implementations of the present disclosure.
Figure 8B:
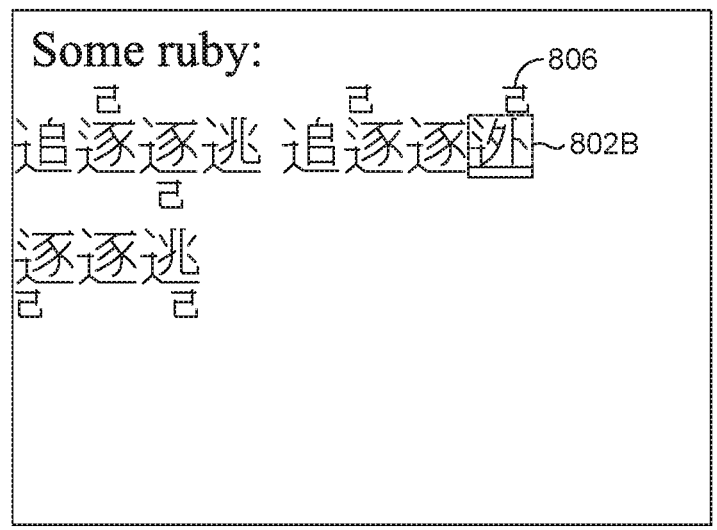

Similarly, FIGS. 8A and 8B are screenshots illustrating the display of an alternate glyph for ruby text. As shown in FIG. 8A, a glyph 802A in the text has been selected, and a context menu 804 is presented with alternate glyphs. When the user selects an alternate glyph from the context menu 804, typographical features are removed from the displayed glyph 802A and typographical features from the selected alternate glyph are applied such that the displayed glyph 802B in FIG. 8B has the appearance of the selected alternate glyph. As can be seen from FIGS. 8A and 8B, the ruby 806 remains intact.

Figures 9C, 9D:
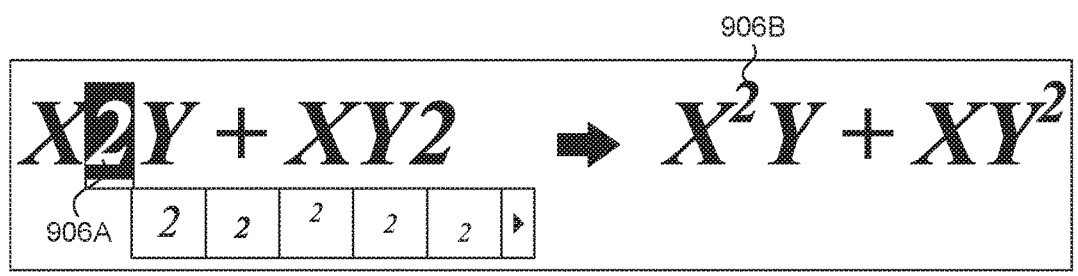

The approach described herein can be used to replace glyphs in displayed text in a variety of different use cases. FIGS. 9A-9D illustrate several use cases. In particular, FIG. 9A illustrates a glyph 902A being replaced with an alternate glyph 902B in a stylized heading. FIG. 9B illustrates a glyph 904A being replaced with an alternate glyph 904B in the case of a stylized drop cap character. FIG. 9C illustrates a glyph 906A being replaced with an alternate glyph 906B in a mathematic equation. FIG. 9D illustrates a glyph 908A being replaced with an alternate glyph 908B to convert a zero to a slashed zero. It should be understood that the use cases shown in FIGS. 9A-9D are provided by way of example only, and the approach described herein can be used in a variety of other use cases to replace a glyph displayed in text with an alternate glyph.

Figure 10:
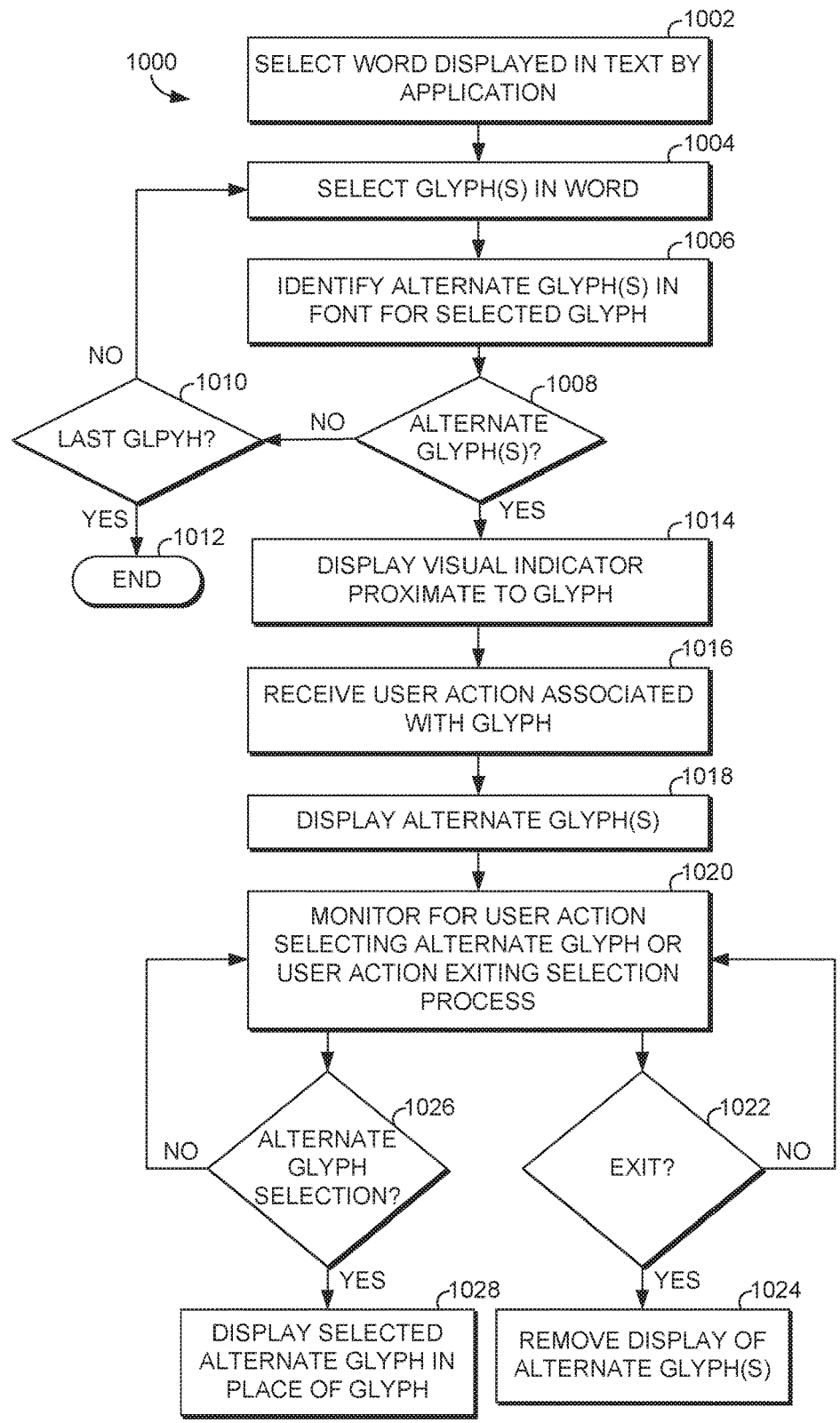
FIG. 10 is a flow diagram showing a method for replacing a glyph in a word in text with an alternate glyph in accordance with implementations of the present disclosure.

In further embodiments, the solution is applied to replace glyphs when a word is selected. FIG. 10 provides a flow diagram of a method 1000 for replacing a glyph in a word in text with an alternate glyph. As shown at block 1002, a word is selected from text displayed by an application. In some configurations, the word is selected automatically, for instance, after the word is entered. In other configurations, the word is selected in response to a user action, such as a hover, double-click, double-tap, or tap and hold on the word or an area (e.g., hotspot area or bounding box) around the word.

As shown at block 1004, a glyph in the word is selected. In some configurations, a glyph is manually selected by a user. In other configurations, the solution iterates through each glyph in the word starting with the first glyph. As shown at block 1006, any alternate glyphs available for the selected glyph are identified. In one configuration, alternate glyphs are identified by determining the character and font of the glyph, and then identifying any alternate glyphs defined for that character in that font.

A determination is made at block 1008 regarding whether there are any alternate glyphs in the font for the selected glyph. If it is determined at block 1008 that no alternate glyphs are available in the font for the selected glyph, a determination is made regarding whether the selected glyph is the last glyph in the word, as shown at block 1010. If so, the process ends as shown at block 1012. If the selected glyph is not the last glyph in the word, the next glyph in the word is selected, as shown by the return to block 1004.

Alternatively, if it is determined at block 1008 that there is at least one alternate glyph, a visual indicator is displayed proximate to the glyph to indicate availability of alternate glyph(s), as shown at block 1014. Any of a variety of different visual indicators can be employed. In one configuration, a highlight (e.g., a blue highlight) is displayed under the selected glyph to indicate the availability of alternate glyphs.

Figure 11A:
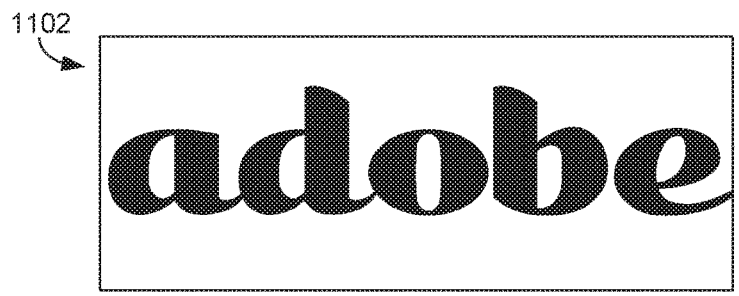
FIGS. 11A-11D are screen displays illustrating replacing a glyph in a word in text with an alternate glyph in accordance with some implementations of the present disclosure.
Figure 11B:
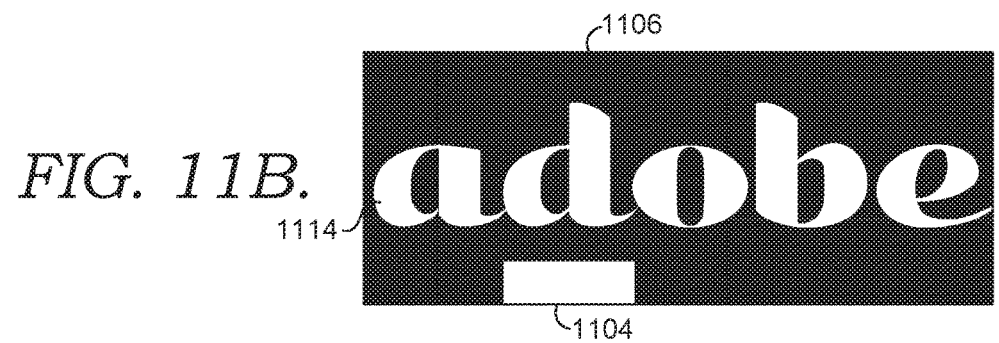

By way of example to illustrate, FIG. 11A illustrates selection of the "adobe" word 1102. In FIG. 11B, a highlight 1104 is displayed under the "d" glyph 1106 to indicate the availability of alternate glyphs. In the present example, it was determined that the "a" glyph 1114 doesn't have any alternate glyphs in the font, while the "d" glyph 1106 has alternate glyphs.

Figure 11C:
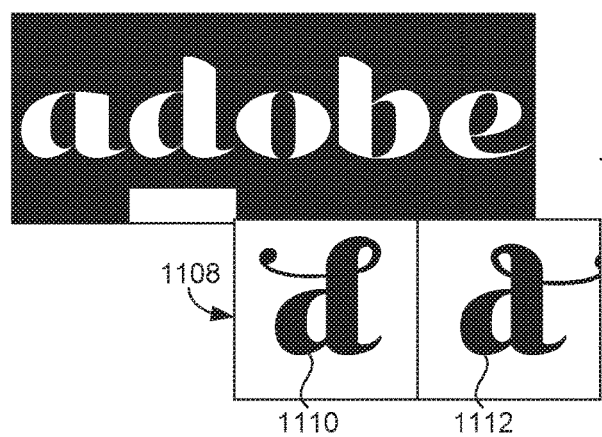

The process of replacing a glyph in the word is similar to replacing a selected glyph described above with reference to blocks 212-224 of FIG. 2. In particular, a user action associated with the glyph is received, as shown at block 1016. In response, the alternate glyph(s) are displayed, as shown at block 1018. For instance, FIG. 11C illustrates a context menu 1108 with alternate glyphs 1110 and 1112 that are displayed in response to a user selecting the "d" glyph 1106 in FIG. 11B.

Figure 11D:
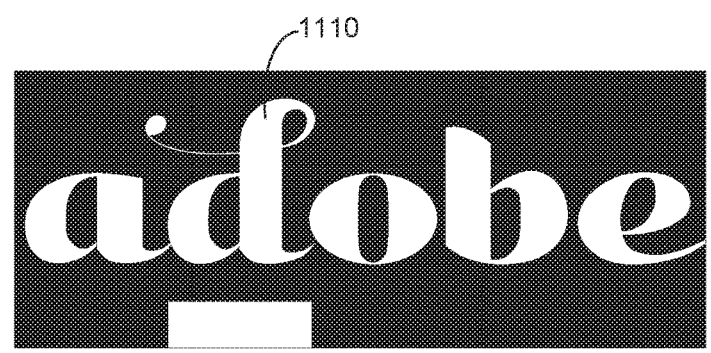

The process continues by monitoring for a user action either selecting an alternate glyph or canceling the selection process, as shown at block 1020. If a user action indicating to cancel the selection process is identified at block 1022, the display of the alternate glyphs is removed, as shown at block 1024. Alternatively, if a user action selecting an alternate glyph is identified at block 1026, the selected alternative glyph is displayed in place of the original glyph, as shown at block 1028. For instance, FIG. 11D illustrates the alternate glyph 1110 having been selected from the context menu 1108 in FIG. 11C and displayed in the "adobe" word 1102. As noted previously, displaying the alternate glyph in place of the original glyph can be done by either replacing the original glyph with the alternate glyph or by removing typographical features from the original glyph and applying typographical features of the alternate glyph.

Figure 12:
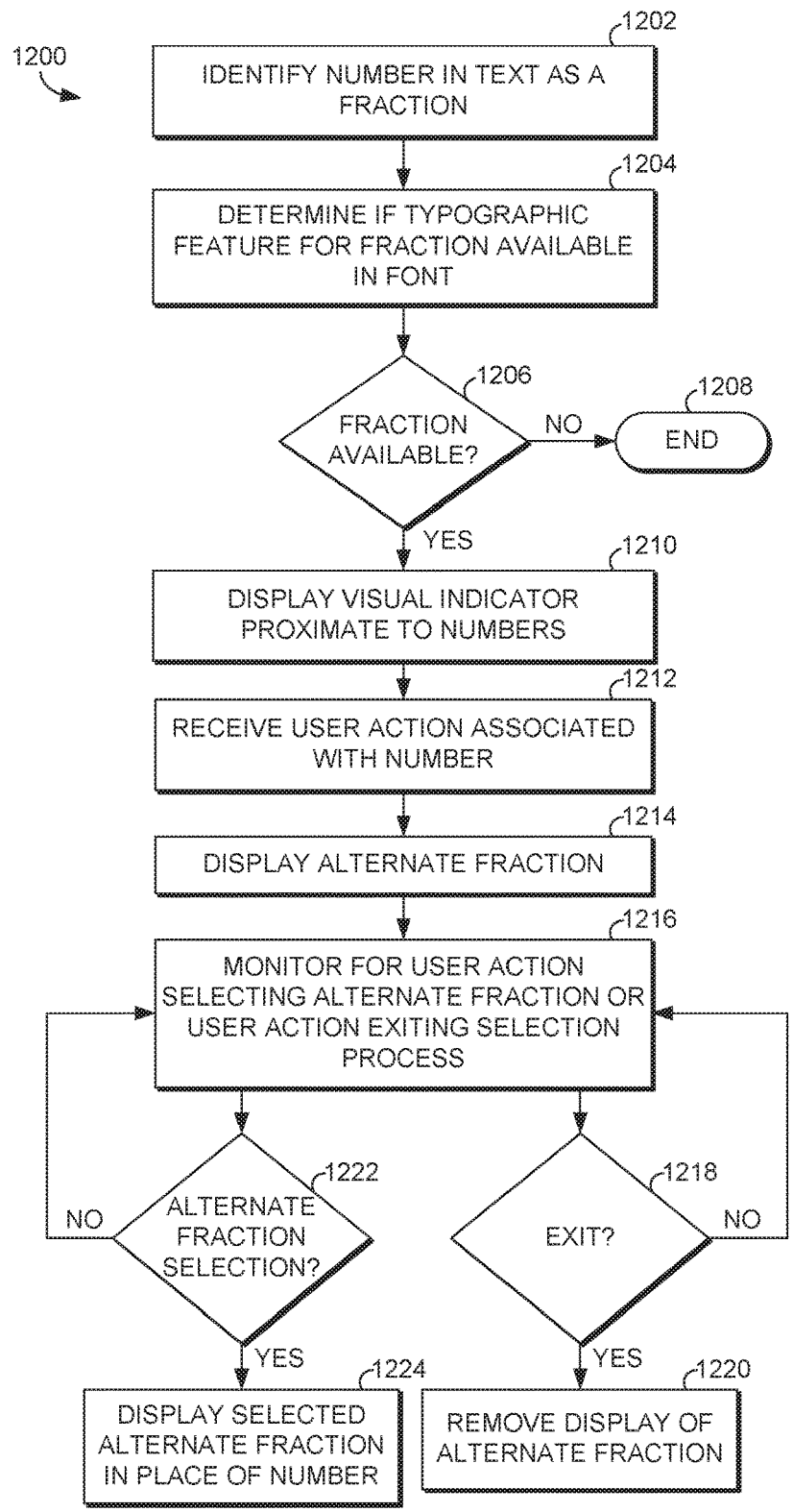
FIG. 12 is a flow diagram showing a method for replacing a number in text with an alternate fraction in accordance with implementations of the present disclosure.

Further embodiments are directed to extending the solution to fractions when a font has a typographical feature for fractions. With reference to FIG. 12, a flow diagram is provided that illustrates a method 1200 for replacing a number in text with an alternate fraction. As shown at block 1202, a number in text is determined to be a fraction, for instance, by identifying numbers separated by a slash in the text. In some configurations, this determination is done automatically, for instance, after the number is entered in the text. In some configurations, this determination is done in response to a user action, such as a user selecting the number using a pointing device.

A determination is made regarding Nether the font uses a typographical feature for fractions, as shown at block 1204. If it is determined at block 1206 that the font does not use a typographic feature for fractions, the process ends, as shown at block 1208. Alternatively, if it is determined that the font uses a typographic feature for fractions, a visual indicator is displayed proximate to the number in the text to indicate that an alternate fraction is available, as shown at block 1210. For instance, a blue highlight could be displayed under the number.

The process of replacing the number with an alternate fraction is similar to replacing a selected glyph described above with reference to blocks 212-224 of FIG. 2. In particular, a user action associated with the number is received, as shown at block 1212. in response, the alternate fraction is displayed, as shown at block 1214. The process continues by monitoring for a user action either selecting the alternate fraction or canceling the selection process, as shown at block 1216. If a user action indicating to cancel the selection process is identified at block 1218, the display of the alternate fraction is removed, as shown at block 1220. Alternatively, if a user action selecting the alternate fraction is identified at block 1222, the selected alternative fraction is displayed in place of the original number, as shown at block 1224. As noted previously, this can be done by either replacing the original number with the alternate fraction or by removing typographical features from the original number and applying typographical features of the alternate fraction.

Figure 13A:
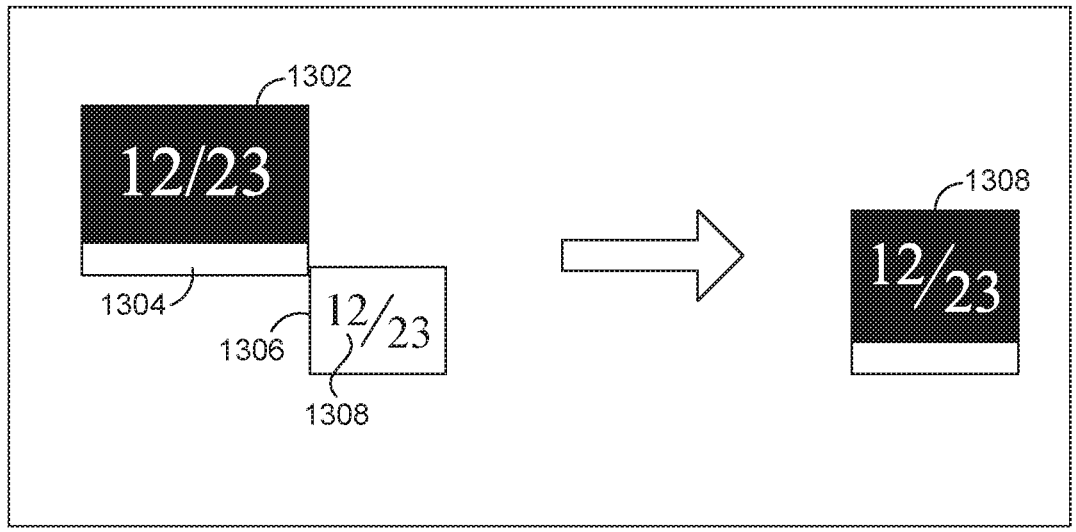
FIGS. 13A-13E are screen displays illustrating replacing a number in text with an alternate fraction in accordance with some implementations of the present disclosure.

FIG. 13A illustrates a number 1302 has been selected, and a visual indicator 1304 is displayed because the font uses a typographical feature for fractions. Additionally, a context menu 1306 is displayed allowing for selection of an alternate fraction 1308. As shown in FIG. 13A, when the user selects the alternate fraction 1308 from the context menu 1306, the number 1302 is replaced with the alternate fraction 1308 in the displayed text.

Figure 13B:
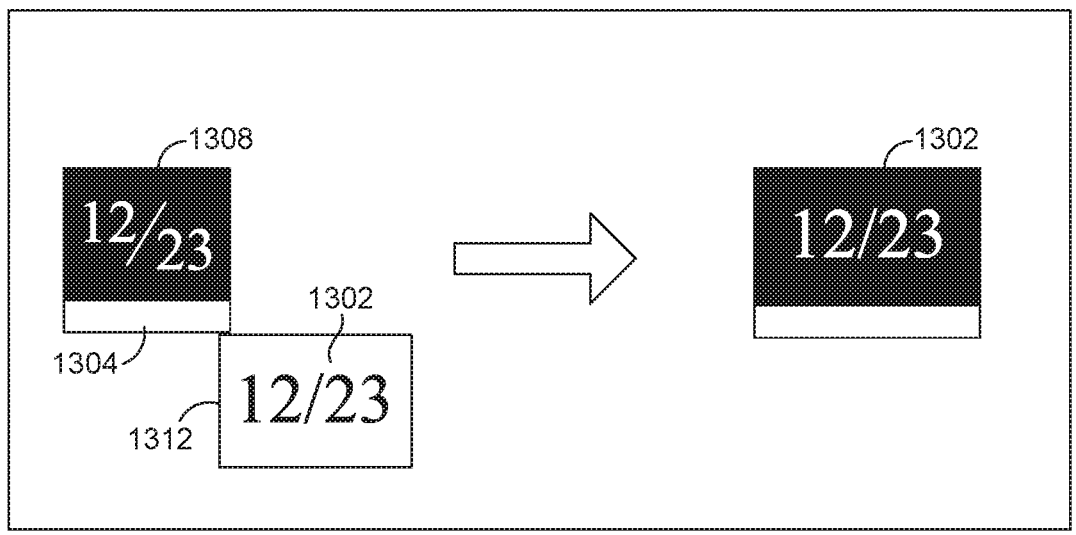

FIG. 13B illustrates that a user can convert an alternate fraction 1308 back to a number 1302. In particular, a visual indicator 1310 is displayed proximate to the alternate fraction 1308. When a user action associated with the alternate fraction 1308 and/or visual indicator is detected, a context menu 1312 is displayed with the number 1302. If the user selects the number 1302 from the context menu 1312, the number 1302 is displayed in place of the alternate fraction 1308 in the text.

Figure 13C:
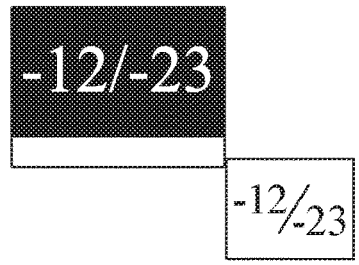
Figure 13D:
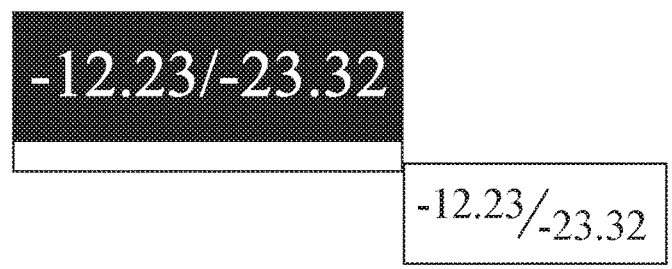
Figure 13E:
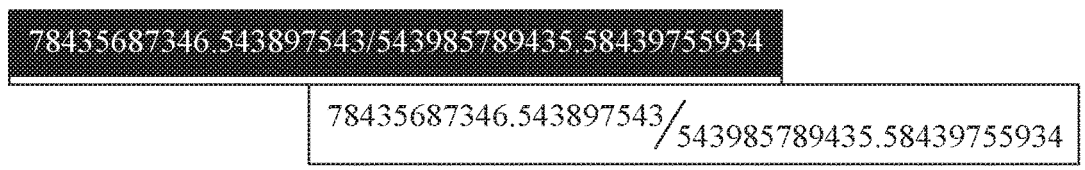

The approach can be used to convert negative numbers into alternate fractions (and vice versa), such as that shown in FIG. 13C. Additionally, the approach can be used to convert decimal numbers into fractions (and vice versa), such as that shown in FIG. 13D. Further, the approach can be used to convert long decimal numbers into fractions (and vice versa), such as that shown in FIG. 13D.

Figure 14:
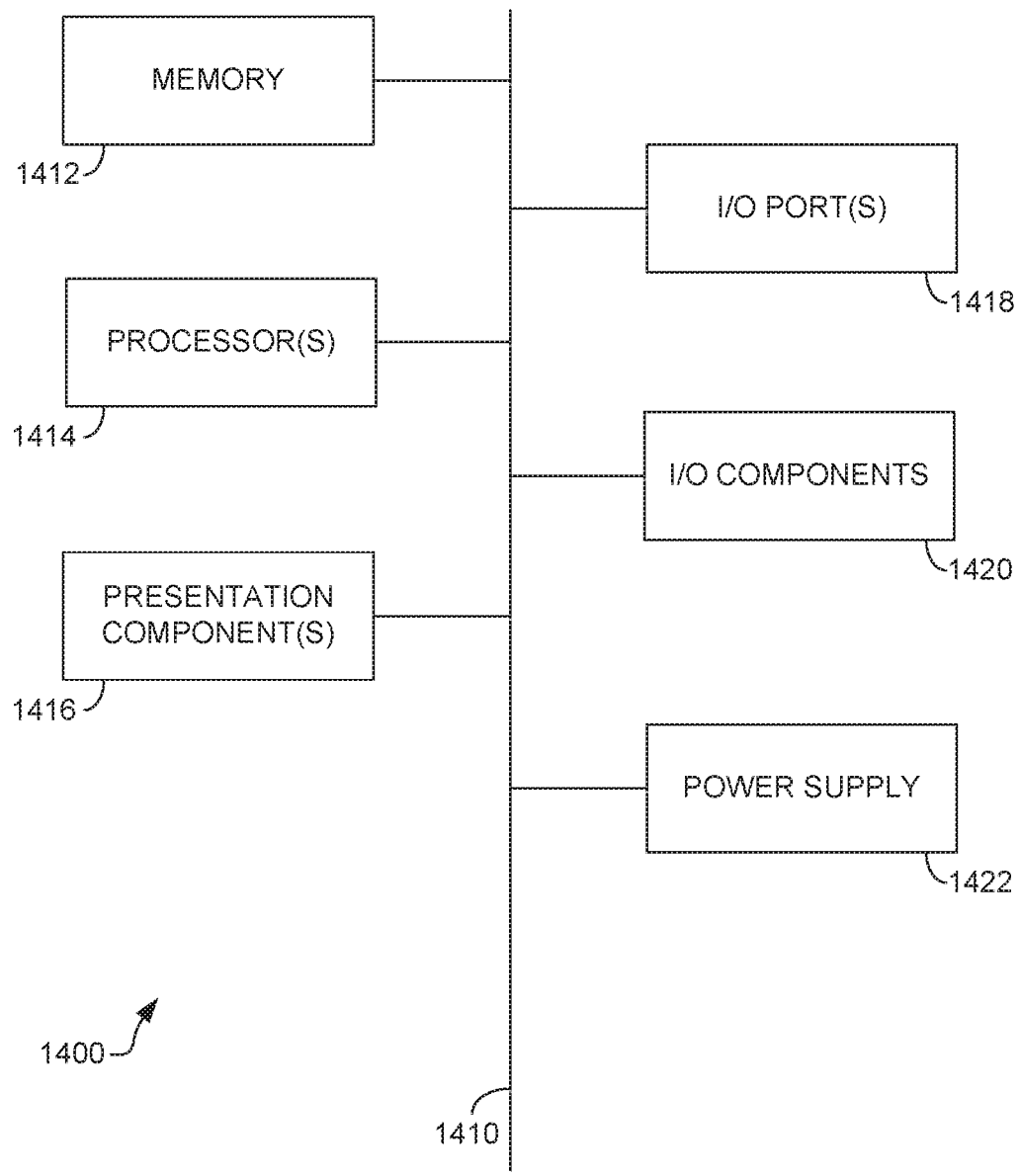
FIG. 14 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 14 in particular, an exemplary operating environment for implementing embodiments of the present invention is shown and designated generally as computing device 1400. Computing device 1400 is but one example of a suitable computing environment and is not intended to suggest any limitation as to the scope of use or functionality of the invention. Neither should the computing device 1400 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes bus 1410 that directly or indirectly couples the following devices: memory 1412, one or more processors 1414, one or more presentation components 1416, input/output (I/O) ports 1418, input/output components 1420, and illustrative power supply 1422. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 14 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors that ad data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1400. The computing device 1400 may be equipped with depth cameras, such as, stereoscopic camera systems, infrared camera systems, RGB camera systems, and combinations of these for gesture detection and recognition. Additionally, the computing device 1400 may be equipped with accelerometers or gyroscopes that enable detection of motion.

As described above, implementations of the present disclosure relate to an efficient and intuitive approach to replacing a glyph in text with an alternate glyph having different typographic features. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for stylizing text displayed by an application on a display device of a computer system, the method comprising:
   identifying one or more alternate glyphs for a glyph displayed by the application on the display device, the one or more alternate glyphs being identified based on a character and font for the glyph, each alternate glyph comprising a rendering of the character using one or more typographical features available for the character in the font;
   providing a visual indicator within a bounding box area of the glyph to indicate the availability of the one or more alternate glyphs;
   receiving a first user action associated with the visual indicator of the glyph;
   in response to the first user action, providing the one or more alternate glyphs as selectable options for display proximate to the bounding box area of the glyph; and
   responsive to a second user action selecting a first alternate glyph from the one or more alternate glyphs, providing the first alternate glyph for display in place of the glyph in the text by:
   identifying one or more first typographic features applied to the glyph;
   identifying one or more second typographic features applied to the first alternate glyph; and
   removing the one or more first typographic features from the glyph and applying the one or more second typographic features to the glyph to transform the glyph to the first alternate glyph while maintaining displayed data tied to the transformed glyph.

2. The method of claim 1, wherein the method further comprises selecting the glyph in the text by receiving an input representing a user action selecting the glyph, the user action comprising one selected from the following: a cursor hovering over an area surrounding the glyph, and a selection of the glyph using a pointing device.

3. The method of claim 1, wherein identifying the one or more alternate glyphs for the glyph comprises:
   querying the font to identify the one or more alternate glyphs for the character in the font.

4. The method of claim 1, wherein the visual indicator comprises a highlight under the glyph.

5. The method of claim 1, wherein the displayed data tied to the transformed glyph comprises a footnote.

6. The method of claim 1, wherein the displayed data tied to the transformed glyph comprises a ruby character.

7. The method of claim 1, wherein the method further comprises initially receiving selection of a word containing the glyph.

8. The method of claim 7, wherein the glyph is selected by iterating through each of a plurality of glyphs in the word until identifying the glyph as having the one or more alternate glyphs.

9. One or more non-transitory computer storage media storing computer-usable instructions that, when executed by a computing device, cause the computing device to perform operations for stylizing text displayed by an application on a display device of a computer system, the operations comprising:

identifying one or more alternate glyphs for a first glyph displayed by the application on the display device, the one or more alternate glyphs being identified based on a character and font for the first glyph, each alternate glyph comprising a rendering of the character using one or more typographical features available for the character in the font;

providing a visual indicator within a bounding box area of the first glyph to indicate the availability of the one or more alternate glyphs;

receiving a first user action associated with the visual indicator of the first glyph;

in response to the first user action, providing the one or more alternate glyphs as selectable options for display proximate to the bounding box area of the glyph;

responsive to a second user action selecting a first alternate glyph from the one or more alternate glyphs, providing the first alternate glyph for display in place of the first glyph by:

identifying one or more first typographic features applied to the first glyph;

identifying one or more second typographic features applied to the first alternate glyph; and removing the one or more first typographic features from the first glyph and applying the one or more second typographic features to the first glyph to transform the first glyph to the first alternate glyph while maintaining displayed data tied to the transformed glyph.

10. The one or more computer storage media of claim 9, wherein the operations further comprise selecting the first glyph in a word by iterating through each glyph in the word to query the font for available alternate glyphs until identifying the first glyph as having the one or more alternate glyphs.

11. The one or more computer storage media of claim 9, wherein the operations further comprise selecting a word in the text by receiving an input representing a user action selecting the word, the user action comprising one selected from the following: a cursor hovering over an area surrounding the word, and a selection of the word using a pointing device.

12. The one or more computer storage media of claim 9, wherein identifying the one or more alternate glyphs for the first glyph comprises:

querying the font to identify the one or more alternate glyphs for the character in the font.

13. The one or more computer storage media of claim 9, wherein the visual indicator comprises a highlight under the first glyph.

14. The one or more computer storage media of claim 9, wherein the displayed data tied to the transformed glyph comprises a footnote.

15. The one or more computer storage media of claim 9, wherein the displayed data tied to the transformed glyph comprises a ruby character.

16. A computer system comprising:

one or more processors; and one or more computer storage media storing computer-usable instructions to cause the one or more processors to:

identify one or more alternate glyphs for a glyph displayed in text by an application on a display device, the one or more alternate glyphs being identified based on a character and a font for the glyph, each alternate glyph comprising a rendering of the character using one or more typographical features available for the character in the font;

provide a visual indicator within a bounding box area of the glyph to indicate the availability of the one or more alternate glyphs;

receive a first user action associated with the visual indicator of the glyph;

in response to the first user action, provide the one or more alternate glyphs as selectable options for display proximate to the bounding box area of the glyph; and responsive to a second user action selecting a first alternate glyph from the one or more alternate glyphs, provide the first alternate glyph for display in place of the glyph in the text by:

identifying one or more first typographic features applied to the glyph;

identifying one or more second typographic features applied to the first alternate glyph; and removing the one or more first typographic features from the glyph and applying the one or more second typographic features to the glyph to transform the glyph to the first alternate glyph while maintaining displayed data tied to the transformed glyph.

\* \* \* \* \*